Figure 1:
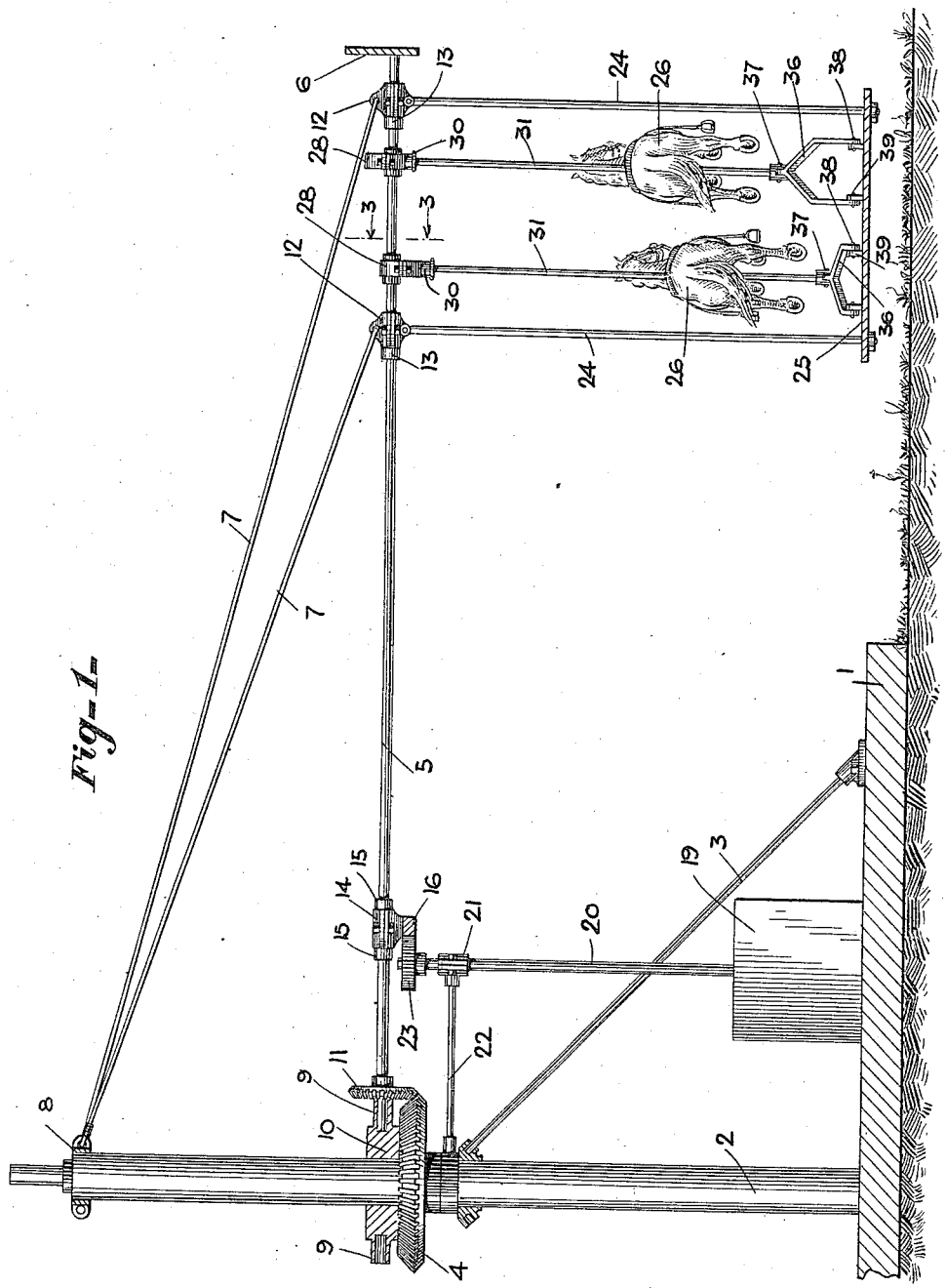

H. L. MILLER.
CAROUSEL.
APPLICATION FILED JULY 16, 1912.

1,059,895.

Patented Apr. 22, 1913.

2 SHEETS—SHEET 1.

WITNESSES
Frank C. Palmer,
F. J. Gaughn.

INVENTOR
Harvey L. Miller
BY Munn & Co
ATTORNEYS

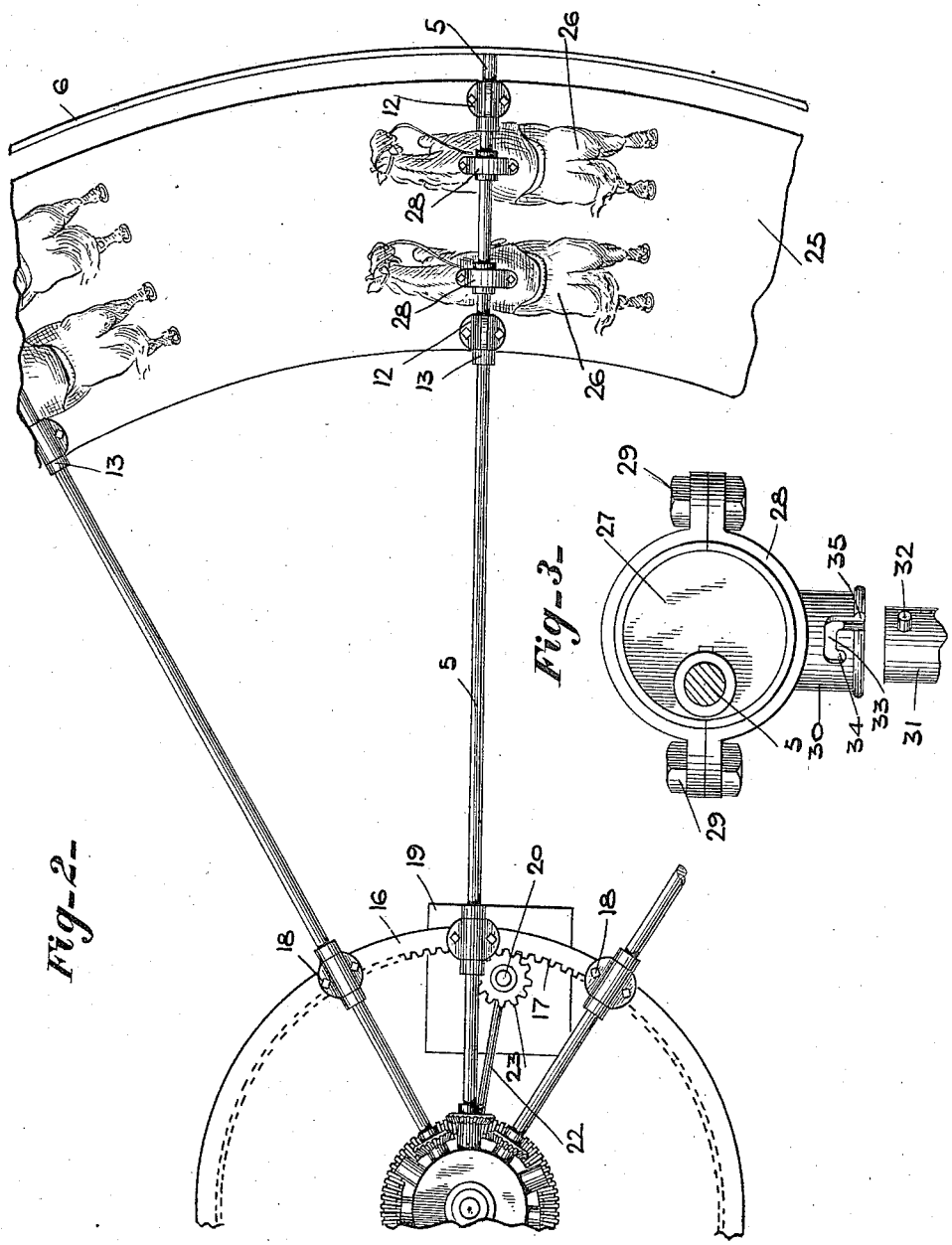

UNITED STATES PATENT OFFICE.

HARVEY L. MILLER, OF LEAVENWORTH, KANSAS, ASSIGNOR TO CHARLES W. PARKER, OF LEAVENWORTH, KANSAS.

CAROUSEL.

1,059,895.  Specification of Letters Patent.  Patented Apr. 22, 1913.

Application filed July 16, 1912. Serial No. 709,793.

*To all whom it may concern:*

Be it known that I, HARVEY L. MILLER, a citizen of the United States, and a resident of Leavenworth, in the county of Leavenworth and State of Kansas, have invented a new and Improved Carousel, of which the following is a full, clear, and exact description.

This invention relates generally to carousels and is more particularly directed to a structure where in the oscillating movement imparted to the figures is brought about through the medium of the overhead construction which carries such figures.

The principal object of my invention is to provide a carousel of new and improved construction especially intended for use in different places, the arrangement of the parts being characterized by simplicity, whereby the outfit is easily and quickly dismantled.

Other objects and advantages of the invention, not particularly pointed out, will appear as the description thereof proceeds, the new and novel features being included within the spirit and scope of the appended claims.

Reference is to be had to the accompanying drawings, forming part of this specification, in which similar characters of reference denote corresponding parts in all the views, and in which—

Figure 1 is a vertical sectional view of a portion of the carousel; Fig. 2 is a partial plan view; while Fig. 3 is a partial vertical sectional view on the line 3—3 of Fig. 1.

The carousel comprises any suitable support 1 having a center pole 2 held in position by means of braces 3; fixed on the pole and preferably at an intermediate point thereof is a bevel gear 4.

Suitably positioned around the pole 2 are a number of radial arms 5 connected together at their outer ends by means of the preferably circular member 6, the horizontal positioning of the arms being insured and bending being prevented by means of the diagonals 7, the upper ends of which are secured to a ring 8 in any suitable manner, the ring being revolubly mounted on the said post 2.

The arms 5 have their inner ends movably mounted in bearings 9 carried by a revoluble element 10 mounted on the said post 2, the arms being provided with bevel gears 11 engaging with the before-mentioned bevel gear 4 fixed to the said post 2. Adjacent the outer ends of the arms are bearings 12 in which they revolve, the bearings being held in position through the medium of collars 13 fixed to the arms; it will be noted that the outer ends of the diagonals 7 engage with these bearings.

Intermediate the ends of the arms 5 are other bearings 14 fixed in position by means of collars 15 carried by the arms, these bearings serving to support a circular rack 16, the teeth 17 of which are on the inside, the engagement of the parts being, preferably by means of bolts and nuts 18, whereby they may be easily taken apart and put together.

In operation, the arms 5 of the carousel are designed to move continuously around the center post 2, the motion being imparted therethrough by means of any suitable power, either mechanical or manual, contained in a housing 19, the said power being transmitted to the carousel through the medium of the shaft 20 mounted in a suitable bearing 21 at the outer end of an arm 22, preferably fixed to the center post 2, the upper end of the shaft being provided with a pinion 23 meshing with the before-mentioned circular rack 16. It is obvious now that if the shaft 20 is turned, movement of the pinion 23 will cause a movement of the rack 16 relatively thereto, the movement of the rack carrying with it the said arms 5, which move around the center post 2. Due to the engagement between the bevel gears 11 on the arms and the fixed bevel gear 4 on the center pole or post, the arms will have an independent turning movement imparted thereto, as these gears 11 travel around the said fixed gear 4. Extending downwardly from the said bearings 12 at the outer ends of the diagonals or braces 7 are the rods 24 supporting a platform 25. This platform provides access to the figures 26 carried by the carousel, the figures oscillating up and down as the platform turns about the center pole or post in substantially the following manner.

Referring particularly to Fig. 3, it will be noted that each arm 5 is provided with a cam in the nature of an eccentric 27, the eccentric being revolubly mounted within the bearing 28 made up preferably of two parts and held together in any suitable manner, as by means of bolts and nuts 29, one of the parts of the bearing being provided with a socketed portion 30. This socket is designed to receive one of the vertical links 31 on which the said figures 26 are fixed, the link being provided with a laterally extending pin 32 adjacent the end engaging the said socket. One side of the socketed portion 30 is provided with a horizontally extending opening 33, one end of which terminates in a pocket 34, the other end of which terminates in a recess 35, the recess being adapted to receive the pin 32 when the end of the link 31 is entered into the socket, the engagement between the link and the socket being maintained by turning the link relatively to the socket until the pin 32 finally seats in the pocket 34; due to the fact that the weight of the link and the figure 26 carried thereby acts downwardly, the pin 32 will be maintained in position securely within this pocket 34.

The lower ends of the links 31 are movably fixed in position to permit the up-and-down or oscillating movement during operation of the carousel through the medium of forks 36, one end of which is in pivotal engagement at 37 with a link 31, the bifurcated end of the fork being in pivotal engagement at 38 with the platform 25 preferably through the medium of suitable bearings 39 carried thereby.

It will be clear now that, as the arms 5 move around the center pole 2, they will be turned individually and that such turning movement will cause the links 31 to oscillate up and down, due to the engagement between the cams or eccentrics 27 carried by the arms 5 and the bearings 28 connected to the upper ends of the links.

From the description given, it is clear that the number of parts usually availed of in structures of this kind is materially reduced, due to the fact that the overhead structure which supports the figures and platform also serves as the moving element through the medium of which the oscillation is imparted to the figures; such simplicity of construction and fewness of parts tend to make out a carousel especially adapted for shipment from place to place and one especially designed for the use of itinerant amusement outfits.

Having thus described my invention, I claim as new, and desire to secure by Letters Patent:—

In a structure of the class described, the combination of a center pole, a gear fixed thereto, a revoluble element on the pole, a number of bearings in the said element, a ring revolubly mounted on the pole, a number of radially extending arms engaging the bearings in the said revoluble element, the said arms being provided with a plurality of bearings, diagonals engaging the bearings and in engagement with the said ring on the pole, a circular rack secured to the said arms, each of the said arms being provided with a bevel gear engaging the said gear on the pole, a motor-driven pinion engaging the said rack whereby the rack, arms and diagonals will be moved around the pole as a center, rods extending downwardly from the bearings on the said arms, a platform carried by the rods, eccentrics secured to the said arms, downwardly extending links engaging the said eccentrics and movable relatively up and down when the said arms are turned, figures carried by the said links, and forks in pivotal engagement with the platform and the lower ends of the said links, whereby the said figures may be oscillated when the structure operates.

In testimony whereof I have signed my name to this specification in the presence of two subscribing witnesses.

HARVEY L. MILLER.

Witnesses:
F. A. WALTER,
ADOLPH W. DIEBEL.

---

Copies of this patent may be obtained for five cents each, by addressing the "Commissioner of Patents, Washington, D. C."